Oct. 16, 1951 J. P. BUTTERFIELD 2,571,198
ENGINE
Filed March 24, 1948 6 Sheets-Sheet 3
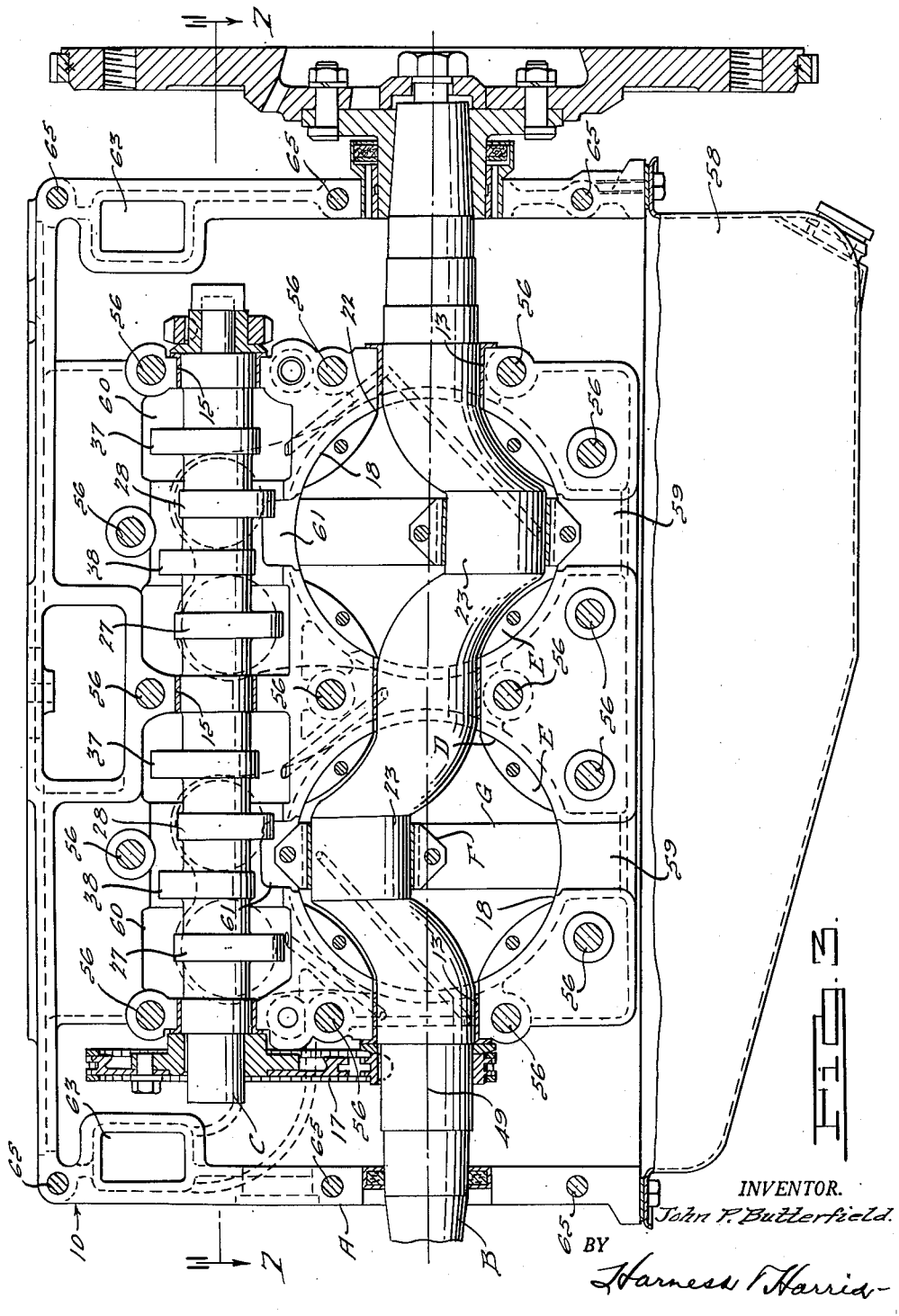
INVENTOR.
John P. Butterfield.
BY
Harness & Harris
ATTORNEYS.

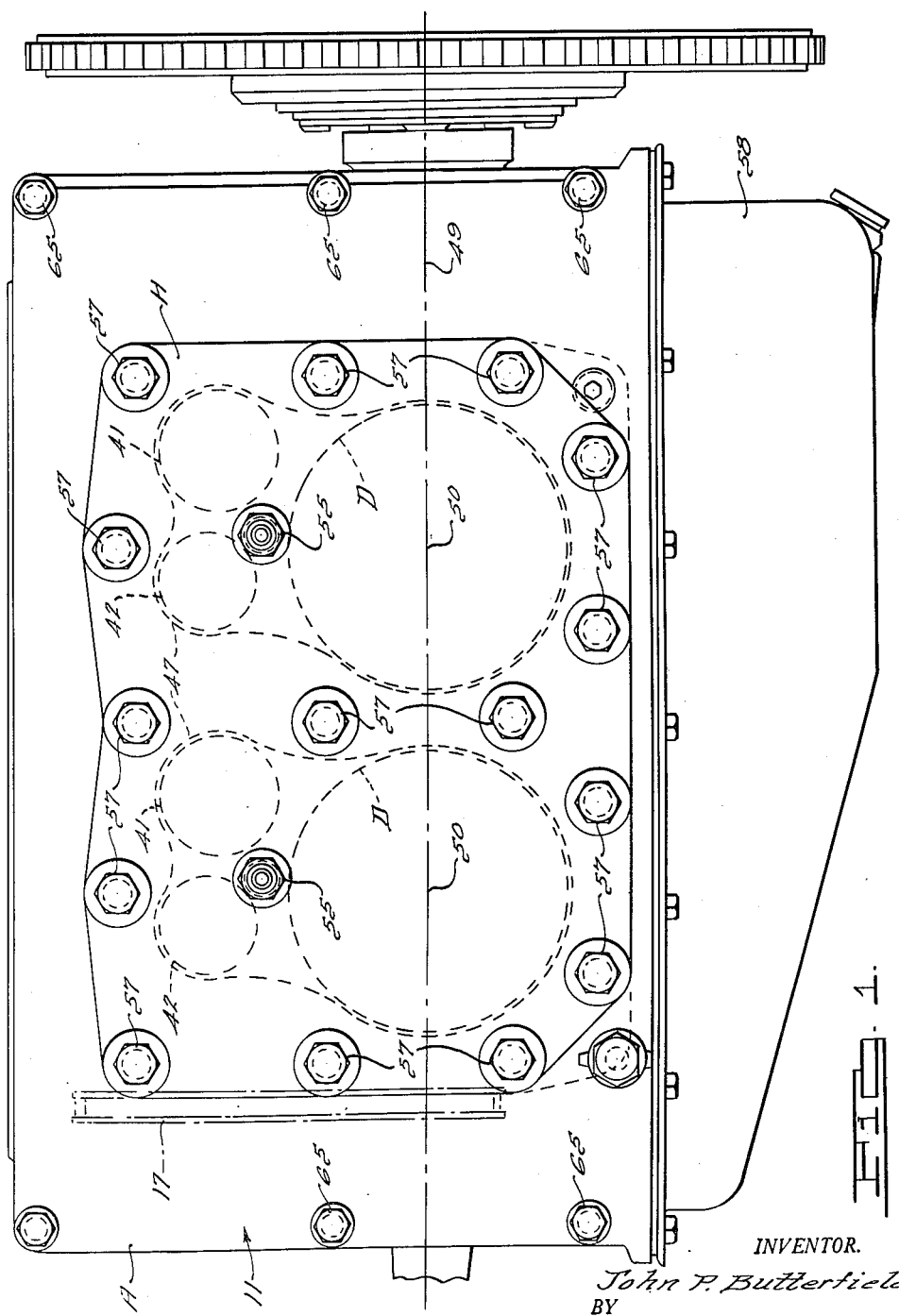

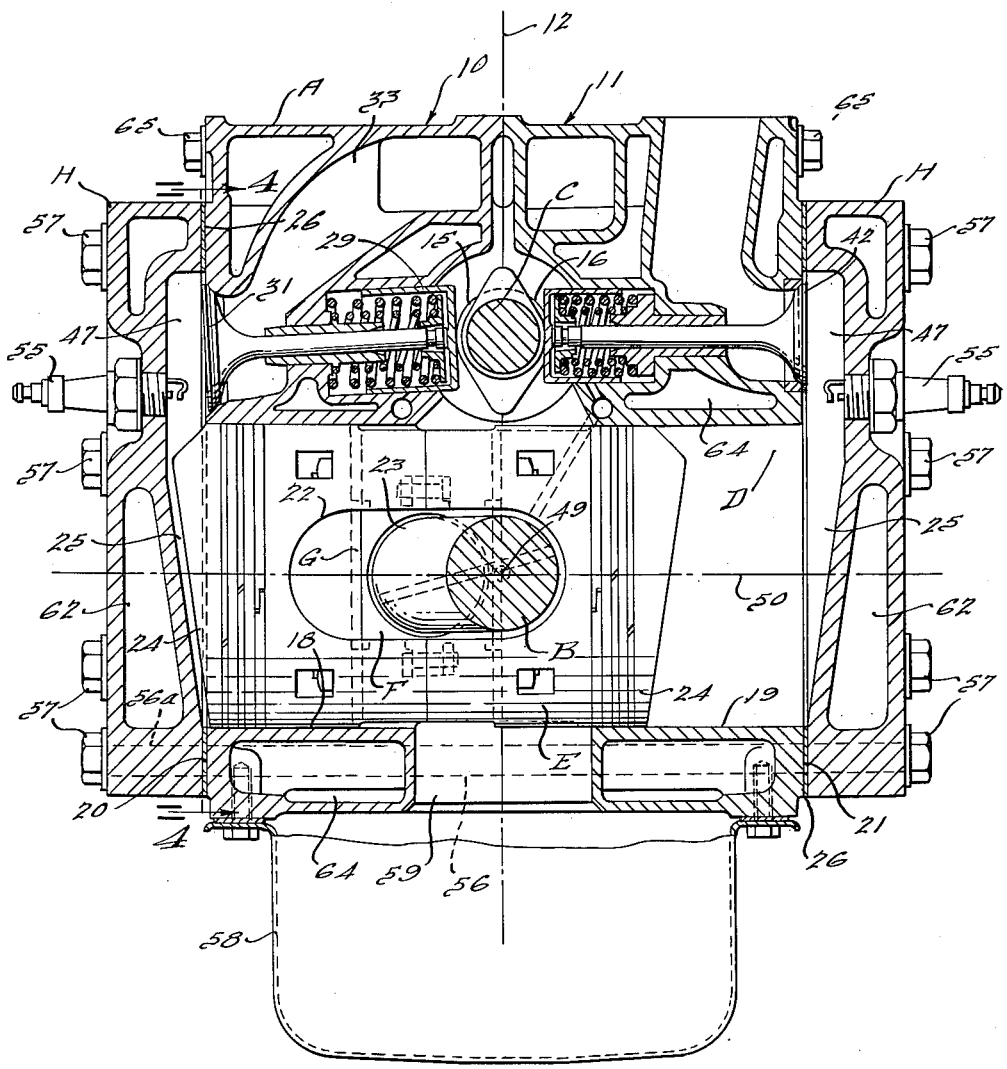

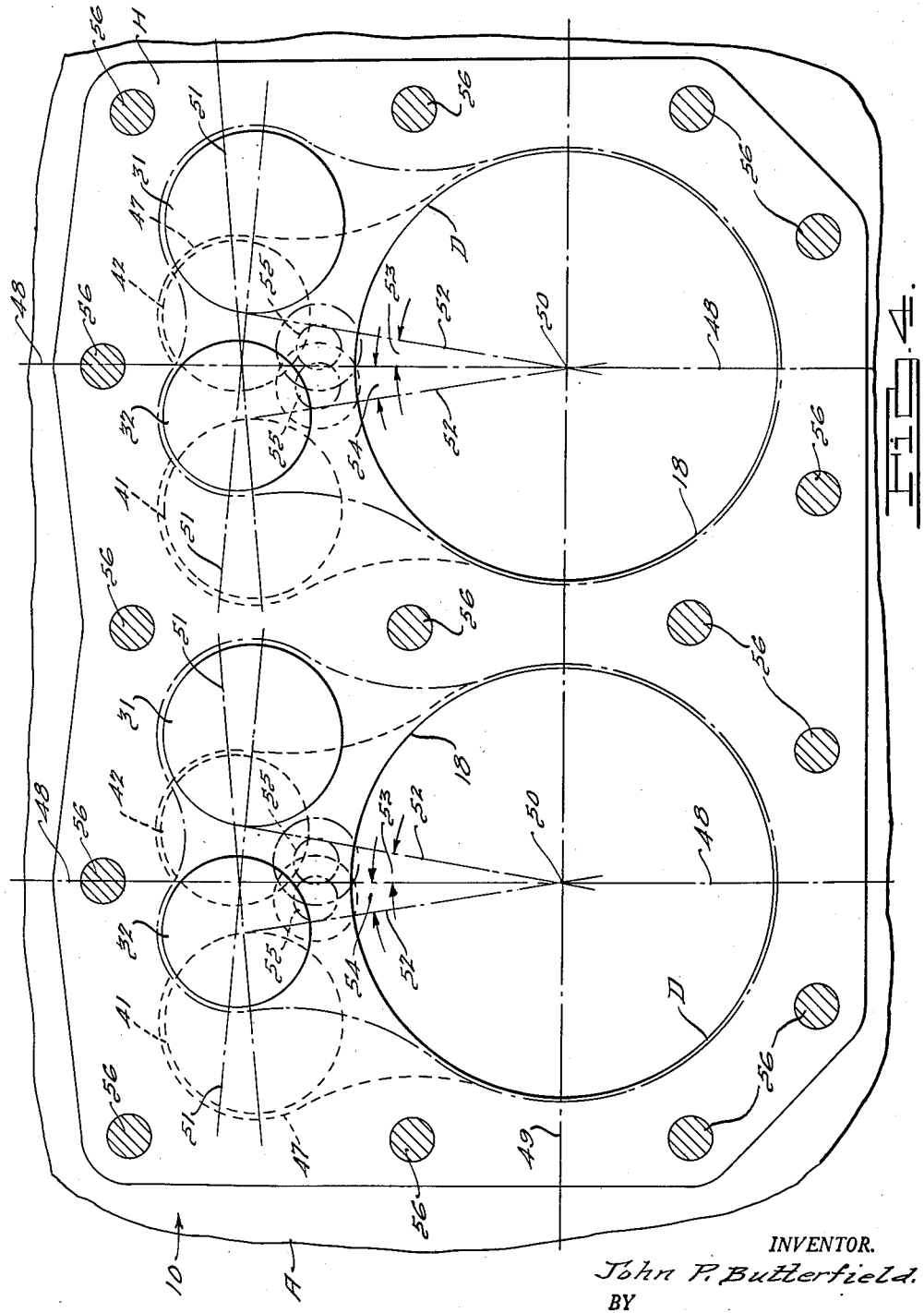

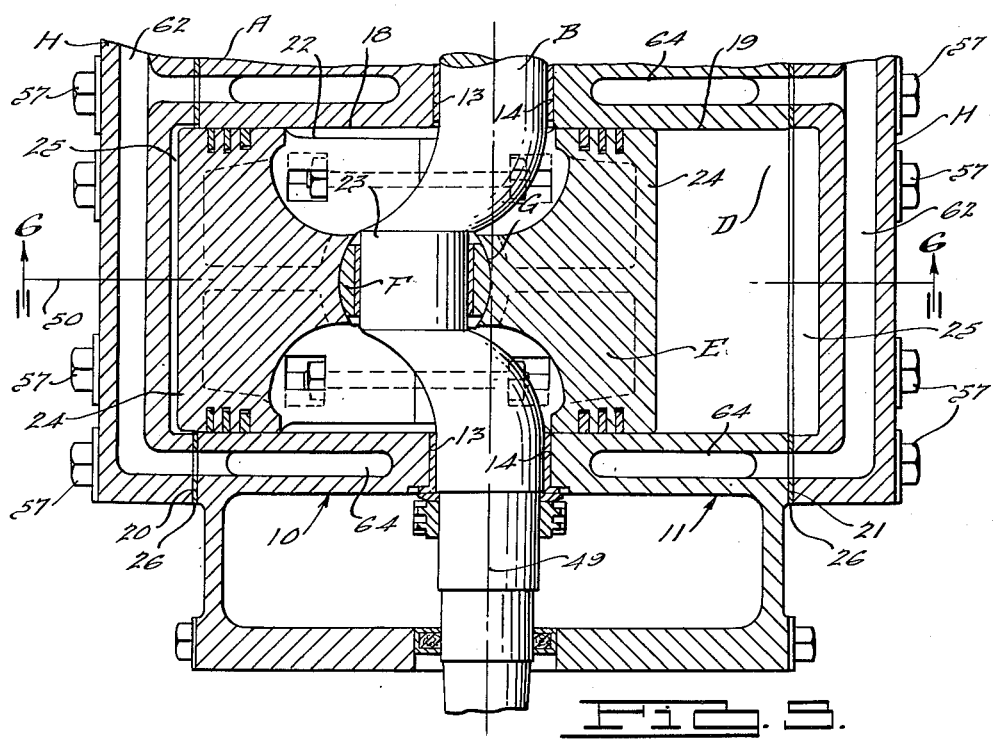
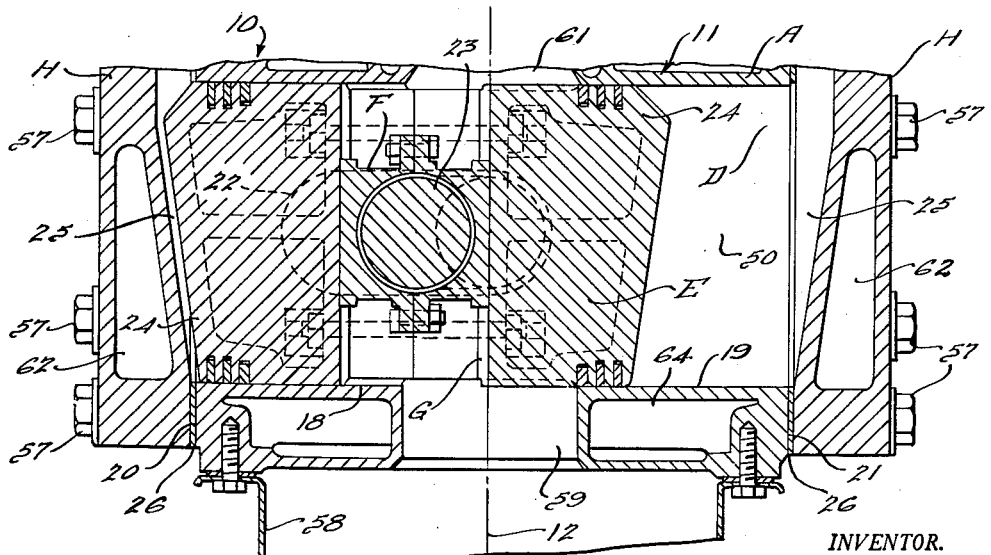

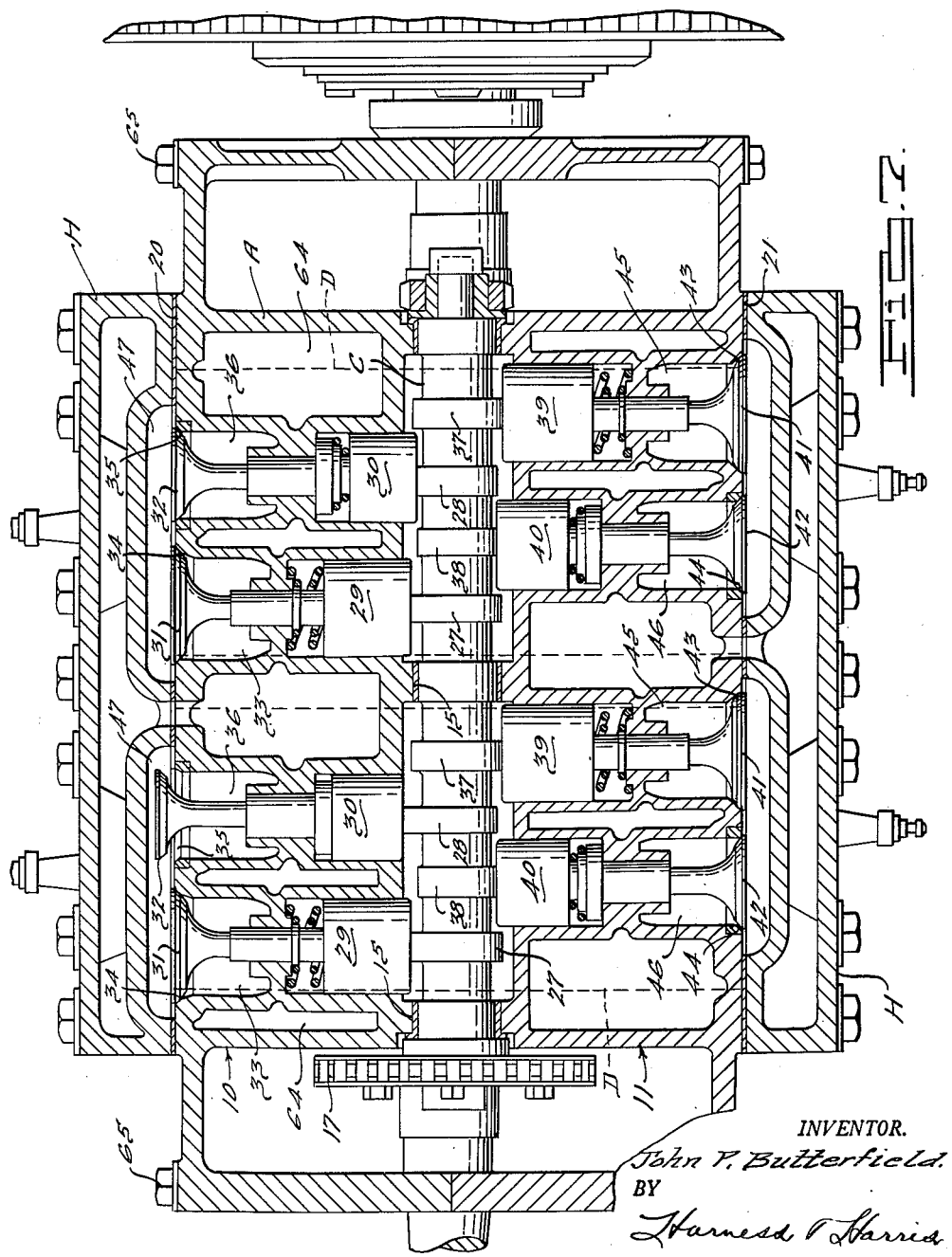

Patented Oct. 16, 1951

2,571,198

UNITED STATES PATENT OFFICE 2,571,198

ENGINE

John P. Butterfield, Grosse Pointe Woods, Mich., assignor to Chrysler Corporation, Highland Park, Mich., a corporation of Delaware Application March 24, 1948, Serial No. 16,647

3 Claims. (Cl. 123—56)

This invention relates to improvements in internal combustion engines of the double acting type or generally similar types wherein each cylinder has a combustion chamber associated with its opposite ends.

It is an object of my invention to provide such an engine having improved compactness with attendant relatively low cost and ease of manufacture.

Another object is to provide an engine of the aforesaid type having an improved arrangement of valving whereby the size of the engine is reduced for a given displacement.

A further object is to provide such an engine wherein identical cylinder heads may be used at each end of the cylinder or cylinders of the engine. This interchangeability of cylinder head structures lessens the cost of manufacturing the engines and has obvious advantages in servicing the engine for replacement of the cylinder heads when necessary.

Another object is to provide an engine of the type aforesaid having its parts so constructed and arranged as to facilitate its assembly and disassembly for manufacture or service.

Further objects and advantages of my invention will be more apparent from the following illustrative embodiment, reference being made to the accompanying drawings in which:

Fig. 1 is a side elevational view of my engine;

Fig. 2 is a sectional elevational view through a typical cylinder of the engine;

Fig. 3 is a sectional side elevational view taken along the vertical mid-plane of the engine;

Fig. 4 is a sectional side elevational view of the engine with one cylinder head removed, the section being taken as indicated by line 4—4 of Fig. 2;

Fig. 5 is a fragmentary sectional plan view through a typical cylinder of the engine; and Fig. 6 is a detail sectional elevational view taken as indicated by line 6—6 of Fig. 5.

Fig. 7 is a sectional plan view taken as indicated by line 7—7 of Fig. 3.

In the drawings reference character A represents the engine cylinder block structure formed of the companion component half-portions 10 and 11 having planar face engagement with each other along the vertical mid-plane of the engine at 12. The cylinder block portions are formed with companion or complementary semi-cylindrical sets of openings 13, 14 and 15, 16 for respectively receiving the illustrated journalling portions of a crankshaft B and camshaft C. The crankshaft and camshaft are thus rotatably mounted in the cylinder block structure A with their axes parallel and disposed in the plane 12, the camshaft overlying the crankshaft. For an engine of the illustrated four stroke cycle the camshaft is driven by the reduction drive mechanism 17.

The cylinder block portions have companion or complementary sets of cylinder bore portions 18, 19, each set forming in effect a continuous cylinder bore D of the engine shown for example as having two cylinders D. Each of these cylinders extends through the cylinder block structure A and opens at its opposite ends at the planar vertical side faces 20, 21 of the respective block portions 10 and 11.

Each cylinder D has a double headed piston structure E reciprocably mounted therein and arranged for connection directly to the crankshaft B which extends through the opening 22 of the several pistons and has the crank portions 23. Each crank portion 23 is journalled in a bearing block F having a sliding fit in a slideway G carried by the associated piston such that reciprocation of the pistons will impart rotation to the crankshaft B. Each piston E has a head 24 at its opposite ends adapted to be operated by the expansive force of the burning fuel mixture in an associated combustion chamber portion 25 provided by the cylinder heads H which are adapted for attachment to the side faces 20 and 21 of the block portions 10 and 11, a gasket 26 being disposed between the planar mating faces of the respective cylinder heads and block portions. The combustion chamber portions 25 of the cylinder heads H thus respectively overlie the opposite ends of the associated cylinder D. The camshaft C is provided with a plurality of pairs of intake valve operating cams 27 and exhaust valve operating cams 28 for respectively operating the tappets or cam followers 29, 30 for the intake and exhaust valves 31, 32 for the combustion chambers 25 of one cylinder head H, it being understood that each such combustion chamber 25 had associated therewith one of these intake valves 31 for controlling inlet of the fuel charge thereto through inlet passageway 33 and intake valve port 34 and one of these exhaust valves 32 for discharge of the products of combustion therefrom through an exhaust valve port 35 and exhaust passageway 36. Likewise for controlling the intake and exhaust of the combustion chambers of the opposite cylinder head H the camshaft has another series of corresponding pairs of intake and exhaust valve operating cams 37 and 38 for respectively operating the cam followers 39 and 40 for the intake and exhaust valves 41 and 42. These valves 41 and 42 control intake and exhaust valve ports 43, 44 and intake and exhaust passageways 45, 46 respectively just as aforesaid in connection with the corresponding parts associated with valves 31 and 32. The illustrated two cylinder engine is of course, in effect, comparable in output to a four cylinder engine as each cylinder had a combustion chamber at each of its ends. My invention is not limited to any number of cylinders and may be used in connection with a single cylinder engine or any number in excess thereof.

It will be noted that one of the cams of each series of the pairs of cams 27, 28 and 37, 38 overlaps, axially of the camshaft, the cams of the other series of such pairs of cams. Thus, for example, considering the cams for controlling the combustion chambers for any one of the cylinders, an exhaust cam 38 is disposed between the pair of cams 27, 28 and likewise for the same cylinder the exhaust cam 28 is disposed between the pair of cams 37, 38.

In order to provide the desired interchangeability of the identical or similar cylinder heads H and at the same time provide the desired compactness of the engine and its valving mechanism without undue tilting of the valve stems from their illustrated positions normal to the camshaft axis, the valve chamber portion 47 of each cylinder head and combustion chamber 25 is offset from a plane 48 normal to the crankshaft axis 49 and containing the axis 50 of the associated cylinder D. As the cylinder heads H are interchangeable, this offset of the valve chamber portions 47 of one cylinder head will be in one direction axially of the crankshaft while the offset of the valve chamber portions 47 of the other cylinder head will be in the opposite direction axially of the crankshaft when the cylinder heads are assembled on the engine. Thus the valve chamber portions 47 of one cylinder head H lie for the most part to one side of the associated planes 48 while the valve chamber portions 47 of the other cylinder head lie for the most part to the other side of the associated planes 48.

Another manner of describing the offset of the valve chamber portions 47 in opposite directions for the two cylinder heads H is as follows. In Fig. 4, 51 is a plane transversely through the engine at the widest portion of a chamber 47, this plane ordinarily passing through the axes of the associated valve. It will be noted that a plane 52, containing cylinder axis 50 and bisecting the portion of plane 51 which lies between the boundary of the valve chamber portion 43, extends at an acute angle 53 with plane 48. Furthermore the plane 52 extends to one side of plane 48 at an angle 53 that is equal and opposite to the angle 54 that is associated with the medially disposed plane 52 of the valve chamber portion at the opposite end of the cylinder.

Each cylinder head H carries a spark plug 55 in association with each of the combustion chambers 25. Although the cylinder heads H are identical with each other it will be observed that an end of either cylinder head is disposed at an end of the engine opposite to that where the corresponding end of the other cylinder head is positioned. Thus by turning either cylinder head end-for-end it may be applied to the opposite side of the engine should occasion arise. While there may be little occasion to interchange the cylinder heads on an engine the fact that they are interchangeable is, of course, of importance in that in manufacture and service only one design of cylinder head is necessary, such single design being used at each end of the cylinder.

The engine is maintained in assembled relationship by a plurality of bolts 56 which extend within the engine through cylinder heads H, and the cylinder block portions 10 and 11, the opposite ends of the bolts having heads 57 which engage flats on the outer side faces of the cylinder heads. Each cylinder head is provided with an identical set or series of bolt-receiving openings 56a. The bolts 56 are tensioned to maintain the cylinder heads H and cylinder block A assembled and thus also maintain the crankshaft B and camshaft C journalled in the cylinder block portions 13, 14 and 15, 16. The bolts 56 are so disposed in relation to the openings through the cylinder heads that the cylinder heads are interchangeable with each other.

If desired the illustrated engine may be turned so that the cylinder heads are vertically spaced from each other or the engine may be operated by mounting it in any other desired position, appropriate relocation of the oil pan 58 being made as will be readily understood. Therefore terminology employed herein to designate the relative positions of the illustrated parts is not by way of limitation but for convenience of reference except as may be specifically set forth in the appended claims. In the illustrated engine which is adapted for mounting with its cylinders D extending transversely between the opposite sides of the engine which are bounded by the cylinder heads H, the lubricating oil reservoir provided by pan 58 is attached to the under faces of the cylinder block portions 10, 11 and is open to the hollow pistons E by a cylinder block opening or passage 59 for drainage of lubricant from the bearing block F and slideway G back to the reservoir. Likewise oil drainage from the camshaft chamber 60 is provided by cylinder block openings 61 leading to the hollow pistons whence the oil drains through openings 59 to the reservoir 58. Any suitable lubricating system may be employed, this not being illustrated as it forms no part of the present invention as claimed herein.

The illustrated engine is of the liquid cooled type, the cylinder heads H being provided with cored coolant circulating passages 62 and the cylinder block portions 10 having similar cored passages 64. If desired, the passages 62 and 64 may be open to each other across the contacting faces of the block portions in plane 12 or the coolant may be circulated to passages 62 and 64 by suitable water headers 63. The complete water circulating system is not illustrated as it does not form a part of the invention claimed herein.

The power from the engine is taken from the rear end at flywheel 66 in a manner customary in general engine practice.

In addition to the bolts 57, shorter bolts 65 are employed to secure together those portions of cylinder block portions 10 and 11 which lie to one side of the cylinder blocks H.

Novel features disclosed but not claimed in the subject application are more fully disclosed and claimed in the copending application of Alexander G. Herreshoff, Serial No. 16,801, filed March 24, 1948, and in my copending application Serial Nos. 16,645, 16,646, 16,648, 16,649 and 16,650, filed March 24, 1948.

I claim:

1. In an engine of the double acting type, in combination, a cylinder block structure having a cylinder extending therethrough, a rotatable crankshaft journalled in said block structure and having a crank portion disposed within said cylinder, a piston structure reciprocably mounted in said cylinder and provided with a piston head at each end thereof, means operably connecting said piston structure with said crank portion, a rotatable camshaft journalled in said block structure, means for driving said camshaft from said crankshaft, a pair of adjacently positioned intake and exhaust valves disposed adjacent each end of said cylinder, the exhaust valve at one end of the cylinder being disposed opposite the intake valve at the opposite end of the cylinder and the intake valve at said one end of the cylinder being disposed opposite the exhaust valve at said opposite end of the cylinder, means for operating said valves in response to rotation of said camshaft, a pair of similarly constructed interchangeable cylinder heads adapted to be detachably secured to the opposite ends of said block structure, one head being at each end of said cylinder and each head having a combustion chamber portion overlying one end of said cylinder having a valve chamber portion connected thereto, and each of said valve chamber portions overlying a pair of said valves, the valve chamber portions of said oppositely disposed cylinder heads being disposed in offset relation to a plane normal to the axis of said crankshaft and containing the axis of said cylinder such that the valve chamber portion of one of said cylinder heads is axially offset for the most part to one side of said plane and the valve chamber portion of the other said cylinder heads is axially offset for the most part to the other side of said plane.

2. In an engine of the double acting type, in combination, a cylinder block structure having a cylinder extending transversely therethrough, a rotatable crankshaft journalled in and extending longitudinally of said block structure and having a crank portion disposed within said cylinder, a piston structure reciprocably mounted in said cylinder and provided with a piston head at each end thereof, means operably connecting said piston structure with said crank portion, a rotatable camshaft driven by said crankshaft and journalled in said block structure and having two pairs of intake and exhaust cams carried thereby, said cams being so arranged that one cam of each of said pairs is disposed between the pair of cams of the other of said pairs, a pair of intake and exhaust valves disposed adjacent each end of said cylinder, the exhaust valve at one end of the cylinder being disposed opposite the intake valve at the opposite end of the cylinder and the intake valve at said one end of the cylinder being disposed opposite the exhaust valve at said opposite end of the cylinder, means providing an operating connection between said intake cams and said intake valves and between said exhaust cams and said exhaust valves, and a pair of interchangeable cylinder heads adapted to be detachably secured to opposite ends of said block structure with one head at each end of said cylinder, each of said cylinder heads having a combustion chamber portion overlying one end of said cylinder and having a valve chamber portion connected thereto and overlying one of said pairs of intake and exhaust valves, the valve chamber portions of said oppositely disposed cylinder heads being disposed in offset relation to a plane normal to the axis of said crankshaft and containing the axis of said cylinder such that the valve chamber portion of one of said cylinder heads is axially offset for the most part to one side of said plane and the valve chamber portion of the other of said cylinder heads is axially offset for the most part to the other side of said plane.

3. In an engine of the double acting type, in combination, a cylinder block structure having a horizontally disposed cylinder extending therethrough, a horizontally disposed rotatable crank shaft journalled in said block structure and having a crank portion disposed within said cylinder, a piston structure reciprocably mounted in said cylinder and provided with a piston head at each end thereof, means operably and directly connecting said piston structure with said crank portion, a horizontally disposed rotatable camshaft journalled in said block structure and aligned with and positioned above said crankshaft having two pairs of intake and exhaust cams carried thereby, said cams being so arranged that one cam of each of said pairs is disposed between the pair of cams of the other of said pairs, means for driving said camshaft from said crankshaft, a pair of substantially horizontally disposed intake and exhaust valves disposed above and adjacent each end of said cylinder, the exhaust valve at one end of the cylinder being disposed opposite the intake valve at the opposite end of the cylinder and the intake valve at said one end of the cylinder being disposed opposite the exhaust valve at said opposite end of the cylinder, means providing an operating connection between said intake cams and said intake valves and between said exhaust cams and said exhaust valves, and a pair of similarly constructed interchangeable cylinder heads detachably secured to said block structure, one at each end of said cylinder, each of said cylinder heads having a combustion chamber portion overlying one end of said cylinder and having a connected valve chamber portion overlying the heads of one of said pairs of intake and exhaust valves, the valve chamber portions of said cylinder heads being so disposed in relation to a plane normal to the axis of said crankshaft and containing the axis of said cylinder that the valve chamber portion of one of said cylinder heads is axially offset for the most part to one side of said plane and the valve chamber portion of the other of said cylinder heads is axially offset for the most part to the other side of said plane.

JOHN P. BUTTERFIELD.

REFERENCES CITED

The following references are of record in the file of this patent:

UNITED STATES PATENTS

| Number | Name | Date |
|---|---|---|
| 545,502 | Hennegin | Sept. 3, 1895 |
| 1,018,532 | Twombly | Feb. 27, 1912 |
| 1,047,860 | Twombly | Dec. 17, 1912 |
| 1,140,292 | Sharpneck et al. | May 18, 1915 |
| 1,250,426 | Brush | Dec. 18, 1917 |
| 1,254,281 | Salway | Jan. 22, 1918 |
| 1,276,389 | Mason et al. | Aug. 20, 1918 |
| 1,287,797 | Tietzmann | Dec. 17, 1918 |
| 1,473,602 | Brockway | Nov. 6, 1923 |
| 1,710,721 | Bosmans | Apr. 30, 1929 |
| 2,170,099 | Stubings | Aug. 22, 1939 |
| 2,404,906 | Heald | July 30, 1946 |